United States Patent [19]
Nakano

[11] Patent Number: 5,146,586
[45] Date of Patent: Sep. 8, 1992

[54] ARRANGEMENT FOR STORING AN EXECUTION HISTORY IN AN INFORMATION PROCESSING UNIT

[75] Inventor: Hirotaka Nakano, Tokyo, Japan

[73] Assignee: NEC Corporation, Tokyo, Japan

[21] Appl. No.: 479,379

[22] Filed: Feb. 13, 1990

[30] Foreign Application Priority Data

Feb. 17, 1989 [JP] Japan .................................. 1-36370

[51] Int. Cl.⁵ ............................................. G06F 11/00
[52] U.S. Cl. .................................. 395/575; 364/285.1; 364/285.2; 364/268; 364/DIG. 1; 364/945.1; 364/945.3; 364/DIG. 2
[58] Field of Search ................... 364/200, 900; 371/12, 371/19, 16.5

[56] References Cited

U.S. PATENT DOCUMENTS

| | | | |
|---|---|---|---|
| 3,736,566 | 5/1973 | Anderson | 371/12 X |
| 4,315,313 | 2/1982 | Armstrong | 364/200 |
| 4,559,596 | 12/1985 | Ohnishi | 364/200 |
| 4,598,364 | 7/1986 | Gum | 371/19 |
| 4,661,953 | 4/1987 | Venkatesh | 371/16.5 |
| 4,912,707 | 3/1990 | Kogge | 371/12 |
| 4,941,087 | 7/1990 | Kap | 371/12 X |

OTHER PUBLICATIONS

S. Dale, "Microcode Control For Instruction Retry" IBM TDB, vol. 22, No. 5, Oct. 1979, pp. 1811–1812.

*Primary Examiner*—Robert W. Beausoliel
*Attorney, Agent, or Firm*—Whitham & Marhoefer

[57] ABSTRACT

A tracer memory (7) stores the history of execution of addresses for the microprogram of an information processing unit to provide clues to the identification of the cause of any exceptional event that may occur in the unit. A pointer register (10) is indexed by one to store in the tracer memory the state of a predetermined group of logical signals at a location designated by the pointer value. When the result of addition to the pointer value surpasses the end address of the tracer memory, the pointer value is changed to the head address of the tracer memory so that data previously written is overwritten. The tracer memory contains N addresses and on the occurrence of an exceptional event, the current address J in a pointer register is stored in a mask end register 12 and a preceding address I, separated by a predetermined number M of addresses from address J, is stored in a mask start register 11. The value J-M is stored in said mask start register if J-M>0; otherwise, the value {N+(J−M)} is stored. If a second exceptional event occurs during the execution of a failure recovery procedure for the first exceptional event, there is preserved the execution history of the failure recovery procedure caused by the first exceptional event.

8 Claims, 1 Drawing Sheet

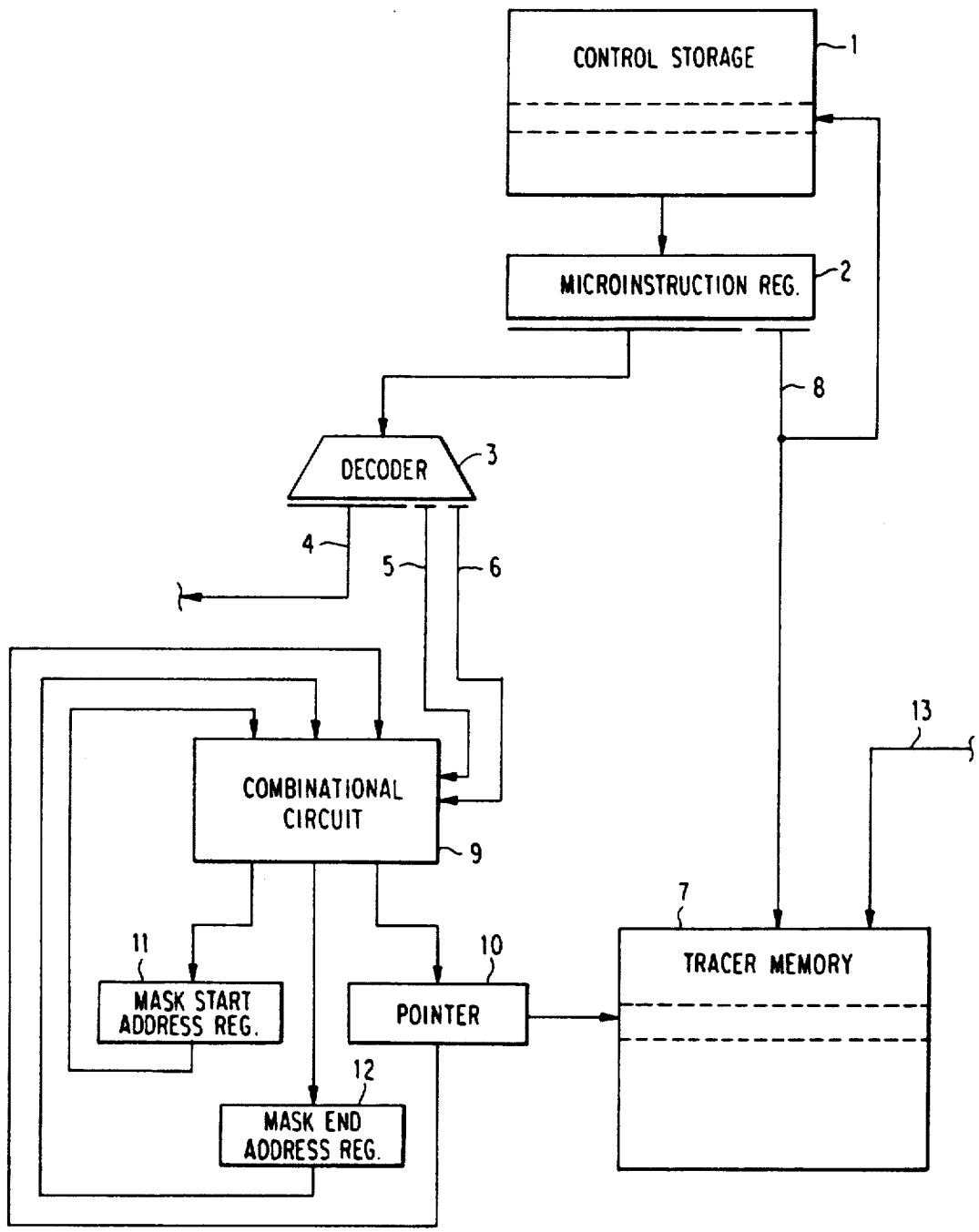

ARRANGEMENT FOR STORING AN EXECUTION HISTORY IN AN INFORMATION PROCESSING UNIT

BACKGROUND OF THE INVENTION

The invention relates to an arrangement for storing an execution history in an information processing unit which includes execution addresses for a microprogram.

Generally, a conventional information processing unit using a microprogram is provided with an arrangement in which a tracer memory stores the history of execution addresses for the microprogram and specific logical signals as clues to the identification of the cause of any exceptional event that may occur in the unit. In such an information processing unit, a microinstruction read out of a control memory is stored in a microinstruction register, and decoded by a decoder, which produces control signals for the execution of this microinstruction. Whereas these operations are successively repeated to form a sequence of the microprogram, if an exceptional event is detected, the storage operation of the tracer memory is suspended, and the inquiry into the cause of the exceptional event occurring in the unit is facilitated by analyzing the execution history of the microprogram stored in the tracer memory. Since the tracer memory is limited in memory capacity, it cannot store all the execution history starting when the unit is activated. For this reason, if the whole storage area of the tracer memory is occupied with history data, the subsequent new history data are written over the old ones.

A recent information processing unit provided with the above-described arrangement in which a higher reliability is required does not suspend its operation even if an exceptional event occurs, but performs a failure recovery procedure such as an instruction retry. Such a unit has the disadvantage that, if a second exceptional event arises while a recovery procedure for the first exceptional event is in progress and if another recovery procedure for the second exceptional event is in turn started, the tracer memory may become fully occupied by the execution history for the second exceptional event, leaving no execution history for the first exceptional event and making it difficult to identify its cause.

An object of the invention is, therefore, to provide an arrangement for storing an execution history in an information processing unit free from the above-mentioned disadvantage of the conventional arrangement.

SUMMARY OF THE INVENTION

According to an aspect of the invention, there is provided an arrangement for storing an execution history in an information processing unit which comprises:
control storage means for storing at least one microprogram consisting of a plurality of microinstructions;
microinstruction storage means for temporarily storing a microinstruction read out of the control storage means;
pointer storage means for storing a pointer value;
history data storage means for storing the state of a predetermined group of logical signals at its storage location designated by the pointer value;
mask-start-address storage means and mask-end-address storage means for storing a mask start address and a mask end address, respectively; and
mask indication means for selectively indicating one of first and second states.

The arrangement further comprises history storage control means for performing: if said mask indication means indicates the first state, a first process of storing the result of addition of the pointer value and one into the pointer storage means and, when said result of addition has surpassed the end address of the history data storage means, storing the head address of the history data storage means into the pointer storage means; if the mask indication means indicates the second state, a second process of updating the pointer value so as to prevent accessing of the addresses ranging from the mask start address in the mask-start-address storage means to the mask end address in the mask-end-address storage means; a third process of having the mask indication means indicate the second state in response to a mask-setting microinstruction read out of the control storage means into the microinstruction storage means and, at the same time, setting the mask start address and mask end address in the mask-start-address storage means and mask-end-address storage means, respectively; and a fourth process of having the mask indication means indicate the first state in response to a mask-resetting microinstruction read out of the control storage means into the microinstruction storage means.

BRIEF DESCRIPTION OF THE DRAWING

Other features and advantages will become more apparent from the following description when taken in conjunction with the accompanying drawing in which:

The sole figure is a block diagram of a preferred embodiment of the invention.

PREFERRED EMBODIMENT OF THE INVENTION

Referring to the drawing, an embodiment of the invention comprises a control storage section 1 in which a microprogram consisting of a plurality of microinstructions is stored; a microinstruction register 2 in which a microinstruction read out of the section 1 is temporarily stored; a decoder 3; a tracer memory 7 given a next execution address signal composed of a part of the microinstruction stored in the register 2 which is produced to signal lines 8; a combinational circuit section 9; a pointer storage section 10 for storing address information for designating a certain address in the memory 7; a mask-start-address register 11; and a mask-end-address register 12. The decoder 3 decodes the microinstruction stored in the microinstruction register 2 and produces various control signals to signal lines 4. If an exceptional event occurs in a processing unit used with the embodiment and a mask-setting microinstruction is stored into the register 2 before the execution of a failure recovery procedure, the decoder 3 produces a mask-setting-code (MSC) signal to a signal line 5. If a mask-resetting microinstruction is stored into the register 2 when the processing unit has been restored to a normal state by the failure recovery procedure, the decoder 3 produces a mask-resetting-code (MRC) signal to a signal line 6. The section 9 has a mask signal flip-flop, which is set by the MSC signal and reset by the MRC signal. For more details of microprogram control, reference may be made to, for instance, the U.S. Pat. No. 3,800,293.

Description will next be made on the operation of the embodiment, first how it operates in a normal condition. A microinstruction is read out of the section 1 into register 2. This microinstruction in the register 2 is decoded by the decoder 3, and a part of the decoded result is produced to signal lines 4 as the control signals for the execution of the microinstruction. Another part of the decoded result is produced to the lines 8 as the next execution address signal to specify the next execution address on the section 1, and the next microinstruction is stored in the register 2. Such a series of actions is repeated. The storage of the next execution address signal on the lines 8 and specific logical signals on signal lines 13 into the memory 7 takes place whenever the contents of the register 2 are updated, and these signals are stored into the memory 7 at a storage location indicated by the contents of the pointer 10. Whenever a storage action is completed in the memory 7, the contents of the pointer 10 increase by one. If the contents of the pointer 10 indicates the end address in the memory 7, the head address in the memory 7 is stored into the section 10 upon completion of the storage at this end address.

Description will next be made on the operation which takes place when a first exceptional event has occurred and accordingly a failure recovery procedure is to be executed. Before the execution of a microprogram routine for failure recovery stored in the section 1, a mask-setting microinstruction is stored into the register 2, and the decoder 3 in response produces the MSC signal to the line 5, resulting in the setting of the mask signal flip-flop existing in the section 9. The section 9, responsive to the setting of the flip-flop, stores an address (J) indicated by the current contents of the pointer 10 in mask end address register 12, and, at the same time, stores an address (I), back by a predetermined number of addresses (M) from the address indicated by the current contents of the pointer 10, into the mask start register 11. Supposing that the address space in the memory 7 ranges from an address (1) to an address (N), the value of (J-M) is stored into the register 11 if it is greater than 0 (>0), and otherwise the value of {N+(J-M)} is stored into the register 11. This is followed by the execution of the failure recovery microprogram routine. Now, whereas the contents of the pointer 10 increase by one and the contents of the lines 8 are written into the memory 7 whenever the contents of the register 2 are updated, when the contents of the pointer 10 plus one have become equal to the contents of the register 11, the contents (J) of the register 12 plus one (J+1), instead of those of the pointer 10 plus one, are stored into the memory 7. In this manner, the addresses (I) to (J) in the memory 7 are masked, that is, the storage into the memory 7 takes place excluding the masked addresses. If a second exceptional event occurs during the execution of the failure recovery procedure, values are set in the registers 11 and 12 in response to a mask setting microinstruction stored into the register 2 in a similar manner to that described above, before the execution of another failure recovery procedure. As a result, there is preserved the execution history of the failure recovery procedure caused by the first exceptional event, which has been stored in the memory 7 at an address designated by the register 11 to another address designated by the register 12.

Description will next be made on the case in which the processing unit has been restored to a normal condition by a failure recovery procedure. Upon restoration from failure, a mask-resetting microinstruction is stored into the register 2, and the decoder 3 in response to this instruction resets the mask signal flip-flop in the section 9 by producing the MRC signal to the line 6, and releases the masking of the memory 7.

What is claimed is:

1. An arrangement for storing an execution history in an information processing unit, comprising:
   control storage means for storing at least one microprogram consisting of a plurality of microinstructions;
   microinstruction storage means for temporarily storing a microinstruction read out of said control storage means;
   pointer storage means for storing a pointer value;
   history data storage means for storing a state of a predetermined group of logical signals at a storage location in said history data storage means designated by said pointer value;
   mask-start-address storage means and mask-end-address storage means for storing a mask start address and mask end address, respectively;
   mask indication means for selectively indicating one of first and second states; and
   history storage control means for performing, if said mask indication means indicates said first state, a first process of storing the result of addition of said pointer value and one into said pointer storage means and, when said result of addition has surpassed an end address of said history data storage means, storing a head address of said history data storage means into said pointer storage means, but if said mask indication means indicates said second state, a second process of updating said pointer value so as to prevent accessing of the addresses ranging from said mask start address in said mask-start-address storage means to said mask end address in said mask-end-address storage means.

2. The arrangement for storing an execution history in an information processing unit as recited in claim 1 wherein said history storage control means further performs a third process of having said mask indication means indicate said second state in response to a mask-setting microinstruction read out of said control storage means into said microinstruction storage means and, at the same time, setting said mask start address and mask end address in said mask-start-address storage means and mask-end-address storage means, respectively.

3. The arrangement for storing an execution history in an information processing unit as recited in claim 2 wherein said history storage control means further performs a fourth process of having said mask indication means indicate said first state in response to a mask-resetting microinstruction read out of said control storage means into said microinstruction storage means.

4. The arrangement for storing an execution history in an information processing unit as recited in claim 1 wherein said history data storage means includes N addresses, said mask-start-address storage means stores a mask start address I and said mask-end-address storage means stores a mask end address J where address I precedes address J by a predetermined number M of addresses.

5. The arrangement for storing an execution history in an information processing unit as recited in claim 4 wherein the value J-M is stored in said mask-start-address storage means if J-M>0; otherwise, the value {N+(J-M)} is stored in said mask-start-address storage means.

6. In an arrangement for storing an execution history in an information processing unit, said arrangement comprising control storage means for storing at least one microprogram consisting of a plurality of microinstructions, microinstruction storage means for temporarily storing a microinstruction read out of said control storage means, pointer storage means for storing a pointer value, history data storage means for storing a state of a predetermined group of logical signals at a storage location in said history data storage means designated by said pointer value, mask-start-address storage means and mask-end-address storage means for storing a mask start address and mask end address, respectively, mask indication means for selectively indicating one of first and second states, and history storage control means, said history storage control means performing the following steps:

if said mask indication means indicates said first state, storing the result of addition of said pointer value and one into said pointer storage means; and, when said result of addition has surpassed an end address of said history data storage means, storing a head address of said history data storage means into said pointer storage means; but if said mask indication means indicates said second state, updating said pointer value so as to prevent accessing of the addresses ranging from said mask start address in said mask-start-address storage means to said mask end address in said mask-end-address storage means.

7. In the arrangement for storing an execution history in an information processing unit recited in claim 6, wherein said history storage control means further performs the step of having said mask indication means indicate said second state in response to a mask-setting microinstruction read out of said control storage means into said microinstruction storage means and, at the same time, setting said mask start address and mask end address in said mask-start-address storage means and mask-end-address storage means, respectively.

8. In the arrangement for storing an execution history in an information processing unit recited in claim 7, wherein said history storage control means further performs the step of having said mask indication means indicate said first state in response to a mask-resetting microinstruction read out of said control storage means into said microinstruction storage means.

* * * * *